United States Patent
Wang et al.

(10) Patent No.: US 7,739,897 B2
(45) Date of Patent: Jun. 22, 2010

(54) SYSTEM FOR DETECTING FAILURES IN FUEL SYSTEMS

(75) Inventors: Zhong Wang, Westland, MI (US); John F. Van Gilder, Webberville, MI (US); Gary L. Rogers, Davison, MI (US); Scott A. Kegebein, Howell, MI (US); Wenbo Wang, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 387 days.

(21) Appl. No.: 11/732,497

(22) Filed: Apr. 3, 2007

(65) Prior Publication Data

US 2008/0245129 A1 Oct. 9, 2008

(51) Int. Cl.
*G01F 19/00* (2006.01)
(52) U.S. Cl. ........................................ 73/1.73
(58) Field of Classification Search ............... 73/1.73
See application file for complete search history.

(56) References Cited

U.S. PATENT DOCUMENTS 6,332,358 B1 * 12/2001 Atkinson .................. 73/304 R
2006/0065040 A1 * 3/2006 Grunwald et al. ........... 73/1.73
2007/0266762 A1 * 11/2007 Rumpf ...................... 73/1.73

FOREIGN PATENT DOCUMENTS

| DE | 259450 A1 | 8/1988 |
| DE | 19617987 A1 | 11/1997 |
| DE | 102004047071 | 4/2006 |
| WO | WO 2006/034937 | * 4/2006 |

OTHER PUBLICATIONS

Office Action for German Application No. 10 2008 016 509.3-52 dated Sep. 14, 2009; 4 pages.

* cited by examiner

*Primary Examiner*—Hezron Williams
*Assistant Examiner*—Nathaniel Kolb

(57) ABSTRACT

A diagnostic system and method for detecting failures in a fuel system of a vehicle includes a fuel level monitoring module that determines a first change in a first fuel level of a first fuel tank based on data received from a first fuel level sensor and determines a second change in a second fuel level of a second fuel tank based on data received from a second fuel level sensor. A sensor diagnosing module evaluates operation of the second fuel level sensor based on the first change in the first fuel level.

18 Claims, 4 Drawing Sheets

SYSTEM FOR DETECTING FAILURES IN FUEL SYSTEMS

FIELD OF THE INVENTION

The present disclosure relates to fuel level monitoring in a vehicle, and more particularly to monitoring a fuel level in a vehicle having primary and a secondary fuel tanks.

BACKGROUND OF THE INVENTION

The statements in this section merely provide background information related to the present disclosure and may not constitute prior art.

Internal combustions engines combust an air and fuel (A/F) mixture within cylinders to produce drive torque. More specifically, the combustion events reciprocally drive pistons that drive a crankshaft to provide torque output from the engine. The fuel is delivered to the engine by a fuel system. The fuel systems of some vehicles include a plurality of fuel tanks. For example, some fuel systems include a primary fuel tank and a secondary fuel tank that share a common filling neck.

The fuel levels within the fuel tanks are monitored and the vehicle operator is informed as to the amount of fuel remaining in each tank. More specifically, a fuel level sensor is provided in each tank. Each fuel level sensor is responsive to the fuel level in a respective tank and generates a signal based the fuel level. The amount of remaining fuel is determined based on the signals. Conventional fuel level monitoring systems include rationality diagnostics to determine whether the fuel level sensors are functioning properly.

SUMMARY

A diagnostic system and method for detecting failures in a fuel system of a vehicle includes a fuel level monitoring module that determines a first change in a first fuel level of a first fuel tank based on data received from a first fuel level sensor and determines a second change in a second fuel level of a second fuel tank based on data received from a second fuel level sensor. A sensor diagnosing module evaluates operation of the second fuel level sensor based on the first change in the first fuel level.

In other features, the sensor diagnosing module determines a fault state of the second fuel level sensor when the first change exceeds a variation threshold and the second fuel level is one of less than and equal to an empty threshold. The fuel level monitoring module determines the second change in the second fuel level when at least one of the first change fails to exceed a variation threshold and the second fuel level exceeds an empty threshold.

In other features, the sensor diagnosing module signals one of a pass state and a failure state of the second fuel level sensor based on the second change and a change threshold. The sensor diagnosing module signals the pass state when the second change exceeds the change threshold and signals the failure state when the second change is one of less than or equal to the change threshold. The system further comprises the first and second fuel level sensors. The fuel system includes a fueling neck common to the first fuel tank and the second fuel tank, wherein the fueling neck receives fuel prior to the fuel level monitoring module determining the first change in the first fuel level of the first fuel tank.

In other features, the system further comprises a control module that activates an electric transfer pump when the first fuel level of the first fuel tank falls below a control threshold, wherein the electric transfer pump transfers fuel from the second fuel tank to the first fuel tank. The control module deactivates the electric transfer pump when one of the first fuel tank reaches a full state and the second fuel tank falls to an empty state. The diagnostic system is activated when an engine of the vehicle is turned on.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
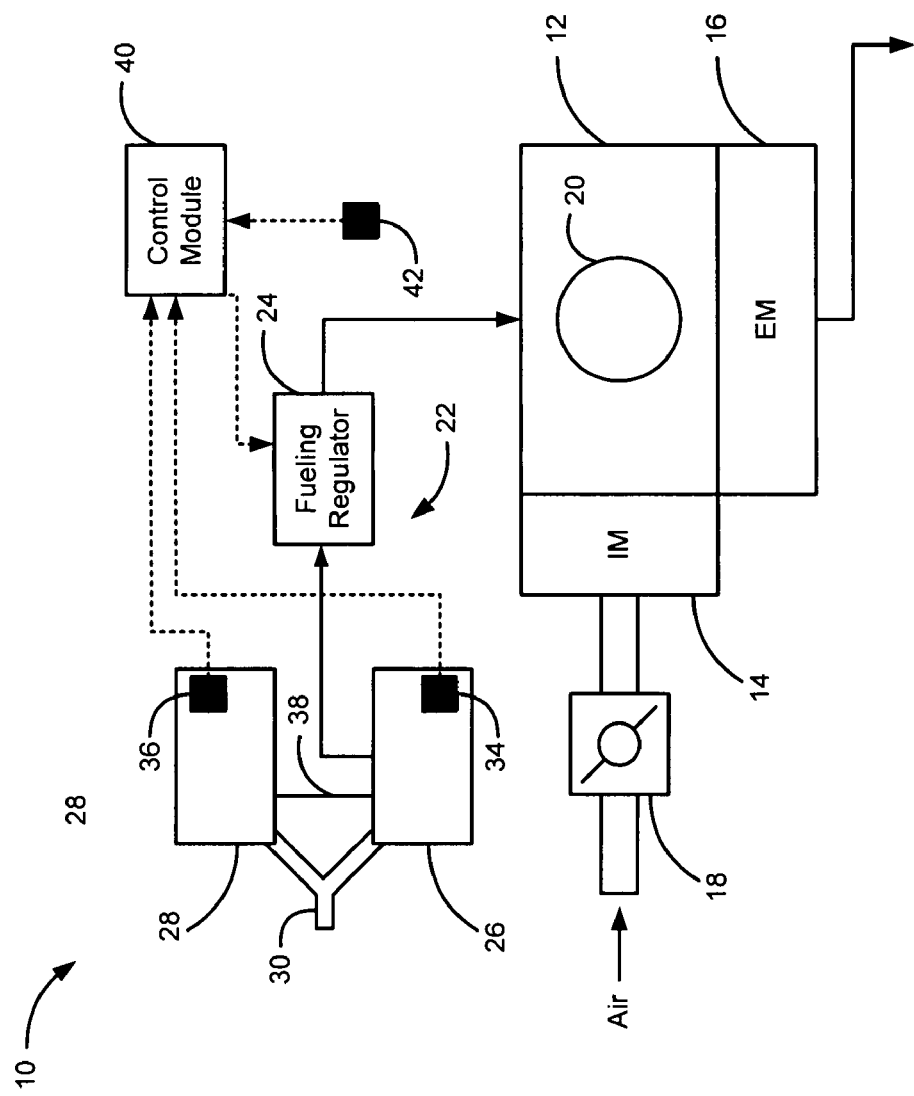
FIG. 1 is a functional block diagram illustrating an exemplary vehicle including a diagnostic system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

A fuel level sensor may improperly report that a corresponding fuel tank is at an empty state (i.e. stuck-in-empty failure). If a stuck-in-empty failure occurs, a transfer pump that transfers fuel from the secondary fuel tank to the primary fuel tank may not operate. Therefore, the fuel in the secondary fuel tank will not be accessible to the engine.

A stuck-in-empty failure of the secondary fuel sensor may falsely enable and/or disable diagnostics such as an evaporative emission control (EVAP) monitor based on incorrect sensing of the fuel level in the secondary fuel tank.

Referring now to FIG. 1, an exemplary vehicle system 10 includes an engine 12 having an intake manifold 14 and an exhaust manifold 16. Air is drawn into the intake manifold 14 through a throttle 18. The air is mixed with fuel, and the fuel and air mixture is compressed and ignited within a cylinder 20 to reciprocally drive a piston (not shown) within the cylinder 20. Although a single cylinder 20 is shown, it is anticipated that the engine 12 can include a plurality of cylinders 20. The piston rotatably drives a crankshaft (not shown) to provide a drive torque output. Fuel is delivered to the engine 12 by a fuel system 22, which includes a fueling regulator 24, a primary fuel tank 26, and a secondary fuel tank 28. In the present implementation, the primary and secondary fuel tanks 26, 28 share a single fueling neck 30. During a refueling event, fuel is fed to the primary and secondary fuel tanks 26, 28 simultaneously via the fueling neck 30.

Primary and secondary fuel level sensors 34, 36 sense primary and secondary fuel levels within the primary and secondary fuel tanks 26, 28, respectively, and generate primary and secondary fuel signals indicating the respective fuel levels. In various embodiments, the primary and secondary fuel level sensors 34, 36 may include a component such as a "float" that is buoyant and floats at a surface of the fuel of each of the respective fuel tanks 26, 28. The primary and secondary fuel level sensors 34, 36 may generate primary and secondary fuel signals based on the position of the floats within the primary and secondary fuel tanks 26, 28, respectively. A fuel transfer mechanism such as an electric transfer pump 38 transfers fuel between the primary and secondary fuel tanks 26, 28.

A control module 40 includes a processor, memory such as random access memory (RAM), read-only memory (ROM), and/or other suitable electronic storage. The control module 40 communicates with the fueling regulator 24, the primary fuel level sensor 34, and the secondary fuel level sensor 36. Additionally, the control module 40 may receive input from other sensors 42 of the exemplary vehicle 10 including, but not limited to, oxygen sensors, engine coolant temperature sensors, mass airflow sensors, and/or engine speed sensors.

The control module 40 executes a sensor diagnostic system of the present invention. The sensor diagnostic system detects and reports a "stuck-in-range" (e.g. stuck-in-empty) failure state of the secondary fuel level sensor 36 based on the primary and secondary fuel signals. In other words, the sensor diagnostic system determines whether the secondary fuel level sensor 36 is improperly sensing that the secondary fuel tank 28 is at an empty state. Although the present implementation describes a sensor diagnostic system operating on the secondary fuel level sensor 36, those skilled in the art can appreciate that a sensor diagnostic system of the primary fuel level sensor 34 may function similarly to the sensor diagnostic system described herein.

Figure 2:
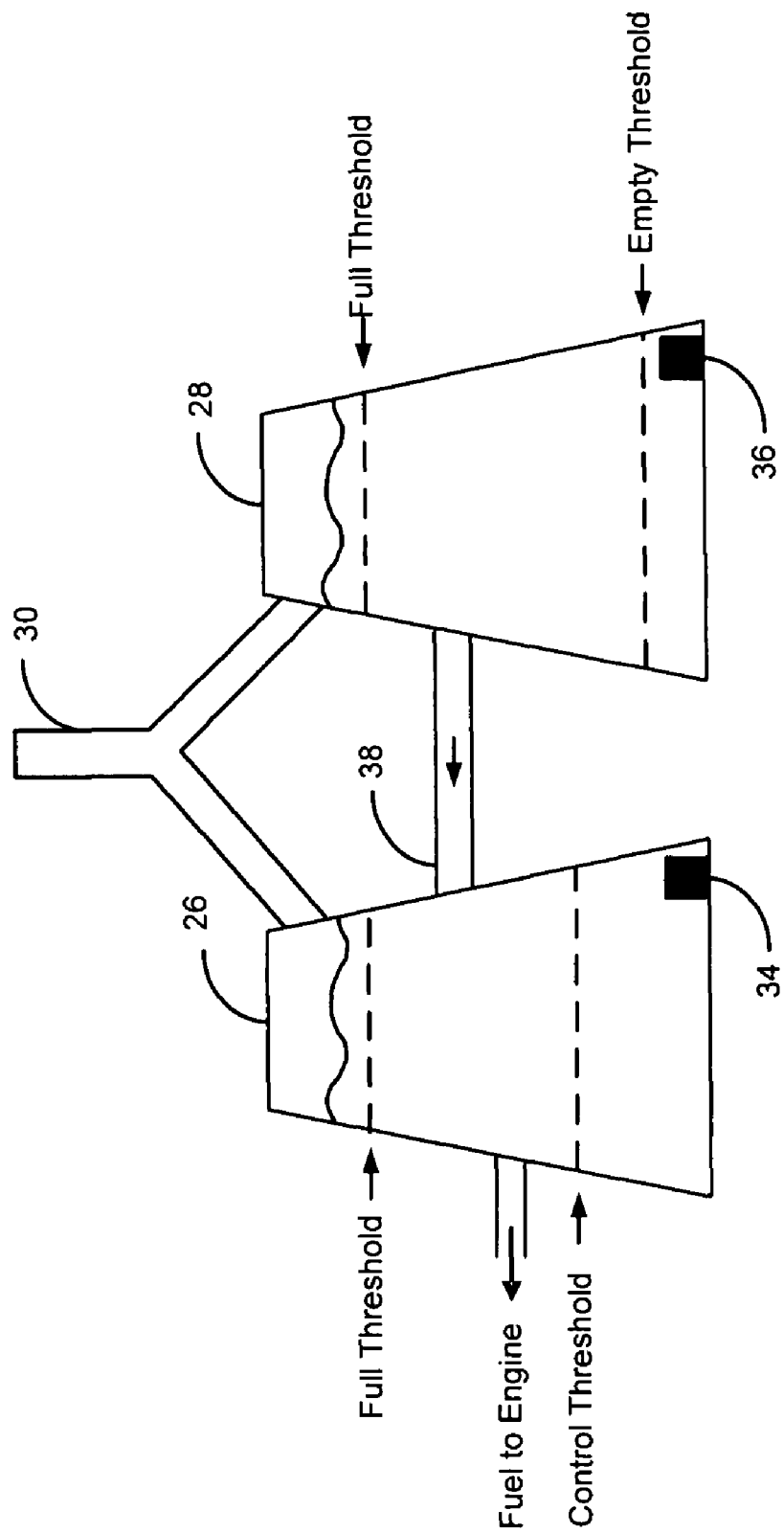
FIG. 2 is a functional block diagram illustrating primary and secondary fuel tanks according to the present invention.

Referring to FIG. 2, the primary and the secondary fuel tanks 26, 28 are shown. The primary fuel tank 26 supplies fuel to the engine 12 during operation of the vehicle 10. Preferably, the control module 40 activates the electric transfer pump 38 to supply fuel from the secondary fuel tank 28 to the primary fuel tank 26 when the primary fuel level falls below a control threshold. The primary fuel tank 26 also includes a first full threshold that indicates whether the primary fuel tank 26 has reached a full state. The secondary fuel tank 28 includes a second full threshold and an empty threshold indicative of a full state and empty state, respectively, of the secondary fuel tank 28. The control module 40 deactivates the electric transfer pump 38 when either the primary fuel tank 26 reaches the full state or the secondary fuel tank 28 falls to the empty state.

Figure 3:
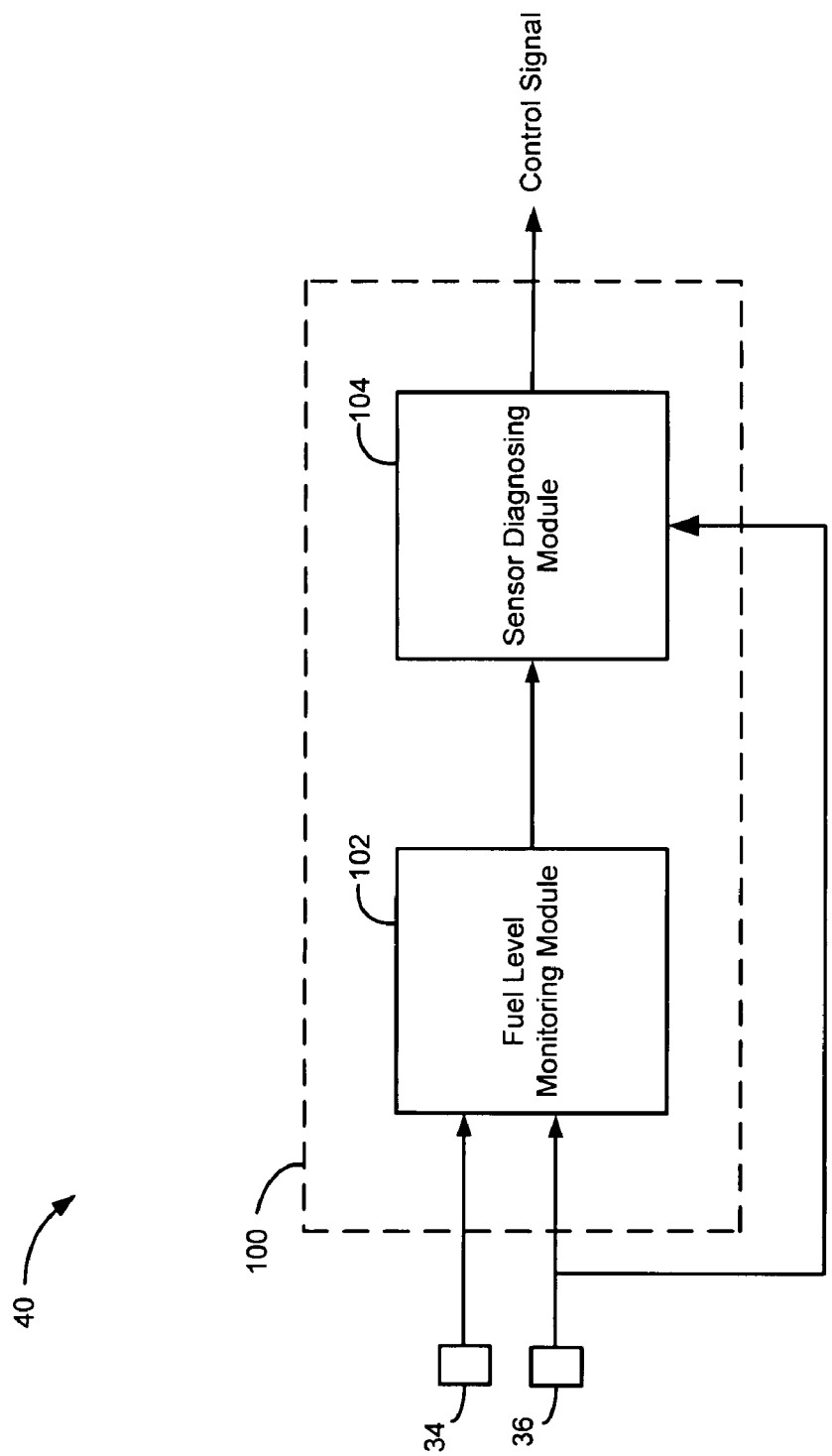
FIG. 3 is a functional block diagram illustrating an exemplary module that executes the diagnostic system of the present invention.

Referring now to FIG. 3, the control module 40 is shown in more detail. The control module 40 includes an exemplary sensor diagnostic system 100 of the present invention. The sensor diagnostic system 100 includes a fuel level monitoring module 102 and a sensor diagnosing module 104. The sensor diagnostic system 100 stores a value of the primary fuel level (i.e. the previous primary fuel level) in memory during a previous key cycle of the vehicle 10. In the present implementation, the sensor diagnostic system 100 stores the previous primary fuel level when the engine 12 is turned off.

The fuel level monitoring module 102 communicates with the sensor diagnosing module 104 and detects changes in the primary fuel level of the primary fuel tank 26 based on input received from primary fuel level sensor 34. The fuel level monitoring module 102 retrieves the previous primary fuel level from memory and determines a current primary fuel level upon activation of the engine 12. The fuel level monitoring module 102 then calculates a change between the previous and current primary fuel levels and determines whether the change exceeds a variation threshold. If the fuel level monitoring module 102 determines that current primary fuel level has increased relative to the previous primary fuel level, the sensor diagnostic system 100 assumes that a refueling event of the fueling system 22 has occurred.

As noted previously with reference to FIG. 2, fuel is fed to the primary and secondary fuel tanks 26, 28 simultaneously via the fueling neck 30 during a refueling event. Therefore, the fuel level monitoring module 102 further assumes that the secondary fuel tank 28 received fuel during the refueling event based on the increase of the current primary fuel level.

The fuel level monitoring module 102 then determines whether the secondary fuel level of the secondary fuel tank 28 exceeds the empty threshold based on input received from the secondary fuel sensor 36. The sensor diagnosing module 104 signals a failure state or a pass state of the secondary fuel level sensor 36 based on the determinations of the fuel level monitoring module 102. Specifically, the diagnosing module 104 signals a failure state if the fuel level monitoring module 102 determines that the secondary fuel level did not exceed the empty threshold.

However, if the fuel level monitoring module 102 fails to detect an increase in current primary fuel level (i.e. no refueling event occurred prior to the current key cycle), the fuel level monitoring module 102 determines a change in secondary fuel level after the vehicle 10 travels a calibrated distance. The sensor diagnosing module 104 signals one of a failure state or a pass state based on the change in the secondary fuel level. If the change in the secondary fuel level exceeds a change threshold, the sensor diagnosing module 104 signals the pass state. However, if the change in the secondary fuel level falls below the change threshold, the sensor diagnosing module 104 signals a failure state indicating a stuck failure state of the secondary fuel level sensor 36.

Figure 4:
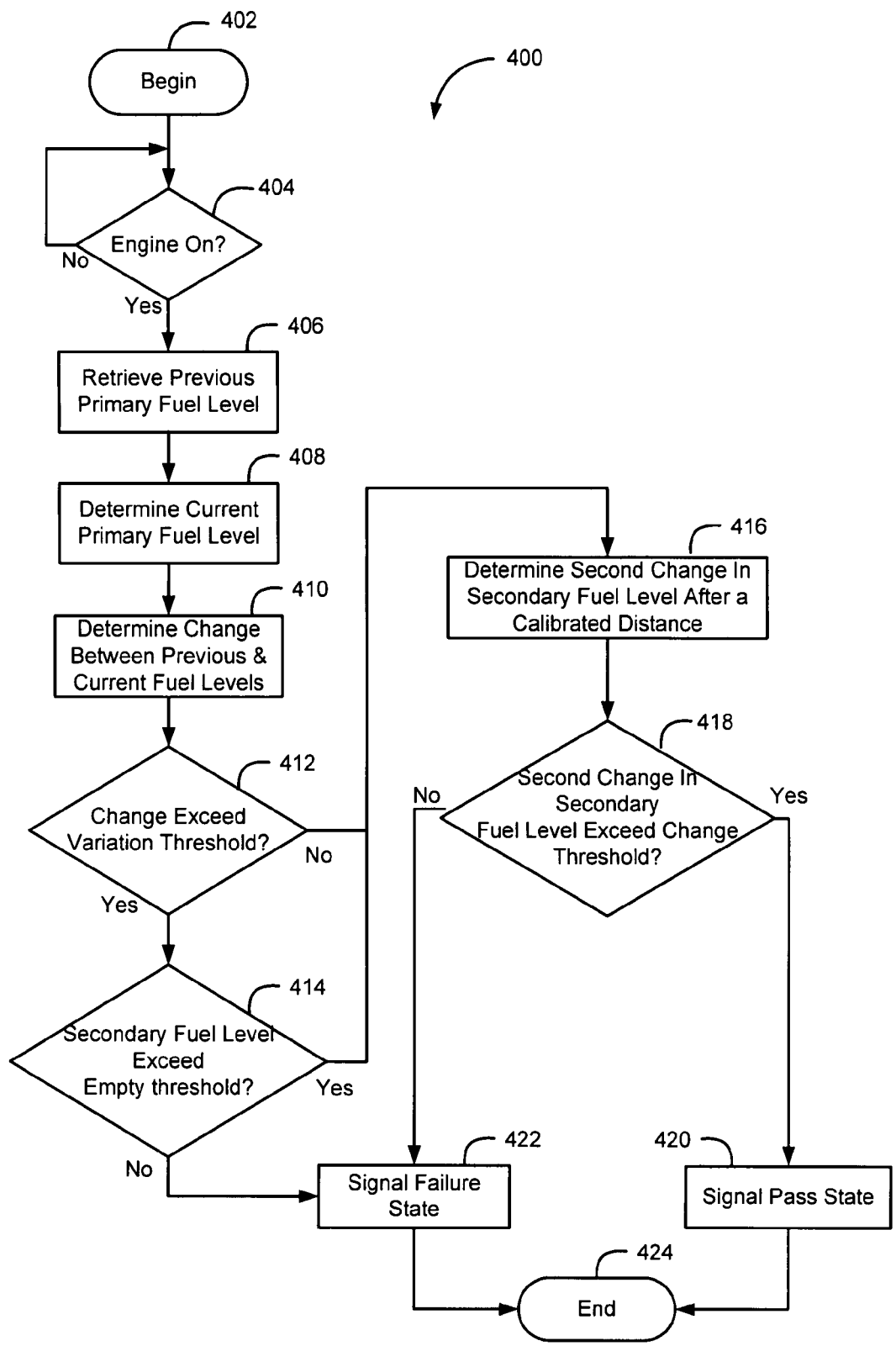
FIG. 4 is a flowchart illustrating exemplary steps executed the diagnostic system of the present invention.

Referring now to FIG. 4 an exemplary method 400 for controlling the diagnostic system will be described in more detail. Control begins the method 400 at step 402. In step 404, control determines whether the engine 12 is on. If control determines that the engine 12 is off, control returns to step 404. If control determines that the engine 12 is on, control proceeds to step 406. Preferably, a user/operator of the vehicle 10 fuels the fuel system 22 prior to turning on the engine 12.

In step 406, control retrieves a previous primary fuel level. In step 408, control determines the current primary fuel level. In step 410, control determines a change between the current primary fuel level and the previous primary fuel level retrieved from memory. In step 412, determines whether the change exceeds a variation threshold. If control determines that the change does not exceed the variation threshold, control proceeds to step 416. If control determines that the change does exceed the variation threshold, control proceeds to step 414. In step 414, control determines whether the secondary fuel level exceeds the empty threshold. If control determines that the secondary fuel level does not exceed the empty threshold, control proceeds to step 420. However, if control determines that secondary fuel level does exceed the empty threshold, control proceeds to step 416.

In step 416, control determines a change in the secondary fuel level after the vehicle 10 travels a calibrated distance. In step 418, control determines if the change in the secondary fuel level exceeds a change threshold. If control determines that the change in the secondary fuel level does exceed the change threshold, control proceeds to step 420. If control determines that the change in the secondary fuel level does not exceed the change threshold, control proceeds to step 422.

In step 420, control signals a pass state indicating that the secondary fuel level sensor 36 is operating properly. In step 422, control signals a failure state indicating that the secondary fuel level sensor 36 is improperly reporting a stuck-in-empty state. The method 400 ends in step 424.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A diagnostic system for detecting failures in a fuel system of a vehicle, comprising:
    a fuel level monitoring module that:
        determines a first change in a first fuel level of a first fuel tank based on data received from a first fuel level sensor; and
        determines a second change in a second fuel level of a second fuel tank based on data received from a second fuel level sensor; and
    a sensor diagnosing module that evaluates operation of said second fuel level sensor based on said first change in said first fuel level,
    wherein said sensor diagnosing module determines a fault state of said second fuel level sensor when said first change exceeds a variation threshold and said second fuel level is one of less than and equal to an empty threshold.

2. A diagnostic system for detecting failures in a fuel system of a vehicle, comprising:
    a fuel level monitoring module that:
        determines a first change in a first fuel level of a first fuel tank based on data received from a first fuel level sensor; and
        determines a second change in a second fuel level of a second fuel tank based on data received from a second fuel level sensor; and
    a sensor diagnosing module that evaluates operation of said second fuel level sensor based on said first change in said first fuel level,
    wherein said fuel level monitoring module determines said second change in said second fuel level when at least one of said first change fails to exceed a variation threshold and said second fuel level exceeds an empty threshold.

3. The system of claim 2 wherein said sensor diagnosing module signals one of a pass state and a failure state of said second fuel level sensor based on said second change and a change threshold.

4. The system of claim 3 wherein said sensor diagnosing module signals said pass state when said second change exceeds said change threshold and signals said failure state when said second change is one of less than or equal to said change threshold.

5. The system of claim 1 further comprising said first and second fuel level sensors.

6. The system of claim 5 wherein said fuel system includes a fueling neck common to said first fuel tank and said second fuel tank, wherein said fueling neck receives fuel prior to said fuel level monitoring module determining said first change in said first fuel level of said first fuel tank.

7. The system of claim 1 further comprising a control module that activates an electric transfer pump when said first fuel level of said first fuel tank falls below a control threshold, wherein said electric transfer pump transfers fuel from said second fuel tank to said first fuel tank.

8. The system of claim 7 wherein said control module deactivates said electric transfer pump when one of said first fuel tank reaches a full state and said second fuel tank falls to an empty state.

9. The system of claim 1 wherein said diagnostic system is activated when an engine of said vehicle is turned on.

10. A diagnostic method for detecting failures in a fuel system of a vehicle, comprising:
    determining a first change in a first fuel level of a first fuel tank based on data received from a first fuel level sensor;
    determining a second change in a second fuel level of a second fuel tank based on data received from a second fuel level sensor;
    evaluating operation of said second fuel level sensor based on said first change in said first fuel level; and
    determining a fault state of said second fuel level sensor when said first change exceeds a variation threshold and said second fuel level is one of less than and equal to an empty threshold.

11. A diagnostic method for detecting failures in a fuel system of a vehicle, comprising:
    determining a first change in a first fuel level of a first fuel tank based on data received from a first fuel level sensor;
    determining a second change in a second fuel level of a second fuel tank based on data received from a second fuel level sensor;
    evaluating operation of said second fuel level sensor based on said first change in said first fuel level; and
    determining said second change in said second fuel level when at least one of said first change fails to exceed a variation threshold and said second fuel level exceeds an empty threshold.

12. The method of claim 11 further comprising signaling one of a pass state and a failure state of said second fuel level sensor based on said second change and a change threshold.

13. The method of claim 12 further comprising signaling said pass state when said second change exceeds said change threshold and signaling said failure state when said second change is one of less than or equal to said change threshold.

14. The method of claim 10 further comprising sensing said first fuel level and said second fuel level.

15. The method of claim 14 further comprising including a fueling neck common to said first fuel tank and said second fuel tank, wherein said fueling neck receives fuel prior to determining said first change in said first fuel level of said first fuel tank.

16. The method of claim 10 further comprising activating an electric transfer pump when said first fuel level of said first fuel tank falls below a control threshold, wherein said electric transfer pump transfers fuel from said second fuel tank to said first fuel tank.

17. The method of claim 16 further comprising deactivating said electric transfer pump when one of said first fuel tank reaches a full state and said second fuel tank falls to an empty state.

18. The method of claim 17 further comprising activating said method when an engine of said vehicle is turned on.

* * * * *